US011369915B2

United States Patent
Asonuma et al.

(10) Patent No.: US 11,369,915 B2
(45) Date of Patent: Jun. 28, 2022

(54) PRESSURE SWING ADSORPTION TYPE HYDROGEN MANUFACTURING APPARATUS

(71) Applicant: Osaka Gas Co., Ltd., Osaka (JP)

(72) Inventors: Hidaka Asonuma, Osaka (JP); Tsubasa Shimizu, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 329 days.

(21) Appl. No.: 16/493,048

(22) PCT Filed: Mar. 15, 2018

(86) PCT No.: PCT/JP2018/010134
§ 371 (c)(1),
(2) Date: Sep. 11, 2019

(87) PCT Pub. No.: WO2018/168985
PCT Pub. Date: Sep. 20, 2018

(65) Prior Publication Data
US 2020/0122080 A1    Apr. 23, 2020

(30) Foreign Application Priority Data
Mar. 16, 2017    (JP) .............................. JP2017-051668

(51) Int. Cl.
*C01B 3/56* (2006.01)
*B01D 53/047* (2006.01)

(52) U.S. Cl.
CPC .............. *B01D 53/047* (2013.01); *C01B 3/56* (2013.01); *B01D 2256/16* (2013.01);
(Continued)

(58) Field of Classification Search
CPC .................... B01D 53/047; B01D 53/0476; B01D 53/053; B01D 2256/16;
(Continued)

(56) References Cited

U.S. PATENT DOCUMENTS 4,077,780 A    3/1978  Doshi
5,354,346 A *  10/1994 Kumar ................ B01D 53/047
                                                          95/101
(Continued)

FOREIGN PATENT DOCUMENTS

| JP | 07016447 A | 1/1995 |
| JP | 2007209868 A | 8/2007 |
| JP | 201538015 A | 2/2015 |

*Primary Examiner* — Frank M Lawrence, Jr.
(74) *Attorney, Agent, or Firm* — The Webb Law Firm

(57) ABSTRACT

A pressure swing adsorption type hydrogen manufacturing apparatus includes a process control unit that controls operation of adsorption towers that generate a product gas by adsorbing, using adsorbents, adsorption target components other than hydrogen components from a source gas, in a state where an adsorption process, a pressure-equalization discharge process, a desorption process, and a pressure-restoration process are successively repeated. The process control unit is configured to control operation of the adsorption towers in such a manner that a prior pressure-equalization process is performed in an initial stage of a unit processing period, a subsequent pressure-equalization process is performed in a final stage of the unit processing period, a pressurization process of introducing a product gas to perform pressurization is performed, as the pressure-restoration process, subsequently to the prior pressure-equalization process, and the pressurization process is performed while overlapping with the subsequent pressure-equalization process.

2 Claims, 5 Drawing Sheets

(52) U.S. Cl.
CPC ............... *B01D 2259/4003* (2013.01); *B01D 2259/40007* (2013.01); *B01D 2259/40041* (2013.01); *B01D 2259/4061* (2013.01); *B01D 2259/40071* (2013.01); *C01B 2203/043* (2013.01)

(58) Field of Classification Search
CPC ........... B01D 2259/40007; B01D 2259/40018; B01D 2259/4003; B01D 2259/40035; B01D 2259/40037; B01D 2259/40041; B01D 2259/40071; B01D 2259/40075; B01D 2259/404; B01D 2259/4061; C01B 3/56; C01B 3/2203; C01B 3/043
USPC ................................ 96/121; 95/96, 102, 103
See application file for complete search history.

(56) References Cited

U.S. PATENT DOCUMENTS

| | | | |
|---|---|---|---|
| 5,656,065 A * | 8/1997 | Kalbassi | B01D 53/047 95/96 |
| 5,704,964 A * | 1/1998 | Kaneko | B01D 53/0476 95/101 |
| 7,618,478 B2 * | 11/2009 | Kumar | C01B 3/48 95/100 |
| 2006/0236863 A1 | 10/2006 | Weist, Jr. et al. | |
| 2006/0288867 A1 * | 12/2006 | Herb | B01D 53/047 95/96 |
| 2011/0005391 A1 | 1/2011 | Cho et al. | |
| 2012/0174776 A1 * | 7/2012 | Baksh | C01B 3/56 95/97 |
| 2013/0042754 A1 * | 2/2013 | Lomax | B01D 53/047 96/116 |
| 2014/0373713 A1 * | 12/2014 | Weist, Jr. | B01D 53/047 95/100 |
| 2016/0016866 A1 * | 1/2016 | Kawashima | B01D 53/047 585/822 |
| 2016/0175761 A1 | 6/2016 | Shimizu et al. | |
| 2019/0126187 A1 * | 5/2019 | Tanaka | B01D 53/0454 |

* cited by examiner

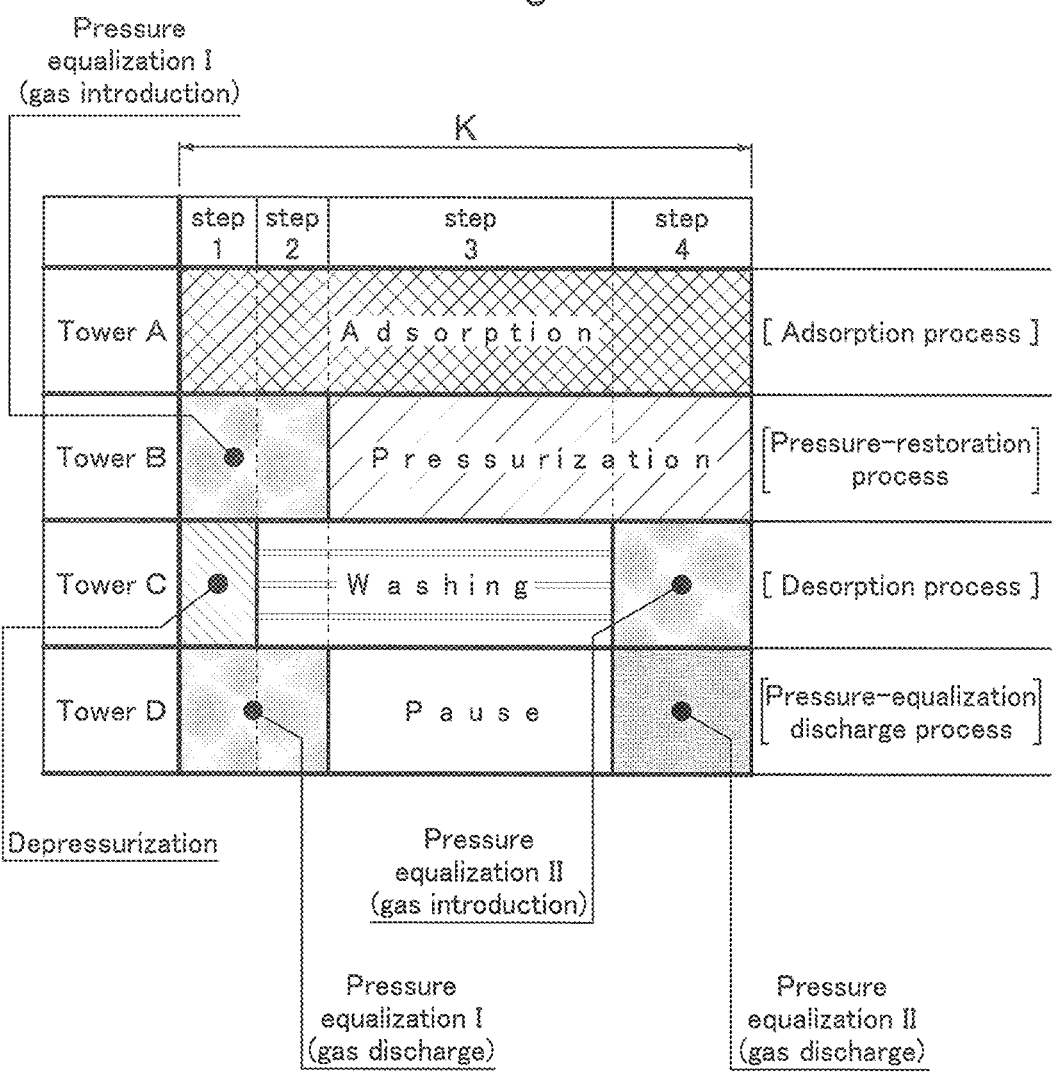

US 11,369,915 B2

PRESSURE SWING ADSORPTION TYPE HYDROGEN MANUFACTURING APPARATUS

This application is the United States national phase of International Application No. PCT/JP2018/010134 filed Mar. 15, 2018, and claims priority to Japanese Patent Application No. 2017-051668 filed Mar. 16, 2017, the disclosures of which are hereby incorporated by reference in their entirety.

TECHNICAL FIELD

The present invention relates to a pressure swing adsorption type hydrogen manufacturing apparatus that includes:

four or five adsorption towers that generate a product gas by adsorbing, using adsorbents, adsorption target components other than hydrogen components from a source gas that contains the hydrogen components; and a process control unit that controls operation of the adsorption towers in such a manner that an adsorption process is performed for a unit processing period in one of the adsorption towers, a pressure-equalization discharge process is performed for the unit processing period in another of the adsorption towers in which a process subsequent to the adsorption process is performed, a desorption process is performed for the unit processing period in another of the adsorption towers in which a process subsequent to the pressure-equalization discharge process is performed, and a pressure-restoration process that is a process preceding the adsorption process is performed for the unit processing period in another of the adsorption towers in which a process subsequent to the desorption process is performed, wherein the pressure swing adsorption type hydrogen manufacturing apparatus is configured to perform, in an initial stage of the unit processing period, a prior pressure-equalization process of supplying gas inside the adsorption tower undergoing the pressure-equalization discharge process to the adsorption tower undergoing the pressure-restoration process, perform, in a final stage of the unit processing period, a subsequent pressure-equalization process of supplying gas inside the adsorption tower undergoing the pressure-equalization discharge process to the adsorption tower undergoing the desorption process, and perform, as the pressure-restoration process, a pressurization process of introducing the product gas to perform pressurization, subsequently to the prior pressure-equalization process.

BACKGROUND ART

Such a pressure swing adsorption type hydrogen manufacturing apparatus produces a product gas having a high hydrogen concentration by adsorbing, using adsorbents, adsorption target components other than hydrogen components from a source gas that contains the hydrogen components and the adsorption target components other than the hydrogen components.

A product gas having a high hydrogen component concentration is produced by separating adsorption target components (carbon monoxide, methane, etc.) other than the hydrogen components from a source gas that is a reformed gas supplied from a reformer that reforms town gas, for example. Some pressure swing adsorption type hydrogen manufacturing apparatus supply the product gas to a fuel cell and supply off-gas, which is discharged from an adsorption tower in which the desorption process is performed, to a combustion device that heats the reformer to burn the off-gas.

A conventional example of such a pressure swing adsorption type hydrogen manufacturing apparatus is configured to stop the pressurization process that is performed subsequently to the prior pressure-equalization process in the pressure-restoration process, just before the start of the subsequent pressure-equalization process (see Patent Document 1, for example).

PRIOR ART DOCUMENTS

Patent Documents

Patent Document 1: JP 2015-38015A

DISCLOSURE OF THE INVENTION

Problem to be Solved by the Invention

It is desirable to improve the product recovery rate of a pressure swing adsorption type hydrogen manufacturing apparatus in a state where the purity of the product is kept from being reduced.

That is, although the product recovery rate of a pressure swing adsorption type hydrogen manufacturing apparatus has been improved by performing the prior pressure-equalization process and the subsequent pressure-equalization process, it is desirable to further improve the product recovery rate in a state where the purity of the product is kept from being reduced.

The present invention was made in view of the above circumstances, and an object of the present invention is to provide a pressure swing adsorption type hydrogen manufacturing apparatus that can improve the product recovery rate in a state where the purity of the product is kept from being reduced.

Means for Solving Problem

A pressure swing adsorption type hydrogen manufacturing apparatus of the present invention includes:

four or five adsorption towers configured to generate a product gas by adsorbing, using adsorbents, adsorption target components other than hydrogen components from a source gas that contains the hydrogen components; and a process control unit configured to control operation of the adsorption towers in such a manner that an adsorption process is performed for a unit processing period in one of the adsorption towers, a pressure-equalization discharge process is performed for the unit processing period in another of the adsorption towers in which a process subsequent to the adsorption process is performed, a desorption process is performed for the unit processing period in another of the adsorption towers in which a process subsequent to the pressure-equalization discharge process is performed, and a pressure-restoration process that is a process preceding the adsorption process is performed for the unit processing period in another of the adsorption towers in which a process subsequent to the desorption process is performed, wherein the process control unit is configured such that a prior pressure-equalization process of supplying gas inside the adsorption tower undergoing the pressure-equalization discharge process to the adsorption tower undergoing the pressure-restoration process is performed in an initial stage of the unit processing period, a subsequent pressure-equalization process of supplying gas inside the adsorption tower undergoing the pressure-equalization discharge process to the adsorption tower undergoing the desorption process is performed in a final stage of the unit processing period, and a pressurization process of introducing the product gas to perform pressurization is performed, as the pressure-restoration process, subsequently to the prior pressure-equalization process, and the pressure swing adsorption type hydrogen manufacturing apparatus has a characteristic configuration in which the process control unit is configured to control operation of the adsorption towers in such a manner that the pressurization process is performed while overlapping with the subsequent pressure-equalization process.

The above-described "initial stage of the unit processing period" means a period that starts at the beginning of the unit processing period, and the above-described "final stage of the unit processing period" means a period that ends at the end of the unit processing period.

If four adsorption towers are provided, a plurality of processes that correspond to the desorption process are successively performed in one adsorption tower, if five adsorption towers are provided, a plurality of processes that correspond to the desorption process are successively performed in two adsorption towers, and the subsequent pressure-equalization process regarding the desorption process is performed after the plurality of processes corresponding to the desorption process.

Performing the pressurization process so as to overlap with the subsequent pressure-equalization process means supplying a portion of the product gas to an adsorption tower to perform pressurization while supplying gas inside an adsorption tower to another adsorption tower to perform pressure equalization.

That is, the process control unit controls operation of the adsorption towers in such a manner that the pressurization process, which is performed subsequently to the prior pressure-equalization process in the pressure-restoration process, is performed while overlapping with the subsequent pressure-equalization process, and therefore the pressurization process can be properly performed and, at the same time, the length of the period for which the prior pressure-equalization process is performed can be increased as a result of the pressurization process being performed while overlapping with the subsequent pressure-equalization process.

An increase in the period of the prior pressure-equalization process results in an increase in the period for which gas inside the adsorption tower undergoing the pressure-equalization discharge process is supplied to the adsorption tower undergoing the pressure-restoration process, and accordingly, it is possible to reduce the speed at which gas inside the adsorption tower undergoing the pressure-equalization discharge process is transferred to the adsorption tower undergoing the pressure-restoration process and consequently reduce the speed at which the gas inside the adsorption tower flows therethrough. As a result, adsorption target components other than hydrogen components, which are adsorbed by adsorbents filling the adsorption tower undergoing the pressure-equalization discharge process, can be kept from flowing together with the gas inside the adsorption tower and moving to the adsorption tower undergoing the pressure-restoration process.

Thus, the adsorption target components other than the hydrogen components, which are adsorbed by the adsorbents in the adsorption tower undergoing the pressure-equalization discharge process, can be kept from moving to the adsorption tower undergoing the pressure-restoration process, and therefore the product recovery rate can be improved in a state where the purity of the product is kept from being reduced.

In particular, the internal pressure of the adsorption tower undergoing the pressure-equalization discharge process is high during the prior pressure-equalization process. Accordingly, if the prior pressure-equalization process is performed in a short period, gas inside the adsorption tower undergoing the pressure-equalization discharge process is transferred at a high speed to the adsorption tower undergoing the pressure-restoration process, and the adsorption target components other than the hydrogen components adsorbed by the adsorbents in the adsorption tower are likely to move together with the gas to the adsorption tower undergoing the pressure-restoration process. However, if the speed at which gas inside the adsorption tower undergoing the pressure-equalization discharge process is transferred to the adsorption tower undergoing the pressure-restoration process is reduced by increasing the length of the period of the prior pressure-equalization process, the purity of the product can be reliably kept from being reduced.

Incidentally, in order to transfer gas inside the adsorption tower undergoing the pressure-equalization discharge process to the adsorption tower undergoing the pressure-restoration process, that is, in order to perform the prior pressure-equalization process and the subsequent pressure-equalization process, a pressure-equalization path that connects the adsorption towers to each other is provided. Further, in order to reduce the speed at which gas inside the adsorption tower undergoing the pressure-equalization discharge process is transferred to the adsorption tower undergoing the pressure-restoration process, a valve (for example, a needle valve) for controlling the speed is provided on the pressure-equalization path.

Accordingly, if the speed at which gas inside the adsorption tower undergoing the pressure-equalization discharge process is transferred to the adsorption tower undergoing the pressure-restoration process is reduced in the prior pressure-equalization process, gas is transferred at a low speed in the subsequent pressure-equalization process as well, and therefore the period for which the subsequent pressure-equalization process is performed is also increased.

Incidentally, in a configuration in which the pressurization process, which is performed subsequently to the prior pressure-equalization process in the pressure-restoration process, is stopped just before the start of the subsequent pressure-equalization process, as is the case with the conventional example, it is possible to consider reducing the period of the pressurization process to increase the period of the prior pressure-equalization process. In this case, however, pressure may fluctuate at portions of the apparatus as a result of the pressurization process being performed in a short period, and it may be difficult to properly produce hydrogen.

That is, the pressurization process is usually performed by supplying a portion of a product gas, which is discharged from an adsorption tower through a product gas feed path, to another adsorption tower. If the pressurization process is performed in a short period, the pressure inside the product gas feed path largely fluctuates as a result of a large amount of product gas being rapidly taken out of the product gas feed path, for example, and there arise problems such as a large fluctuation in the internal pressure of the adsorption tower undergoing the adsorption process, and consequently it may be difficult to properly produce hydrogen.

According to the above-described characteristic configuration, the pressurization process is performed while overlapping with the subsequent pressure-equalization process, and therefore the pressurization process can be properly performed for a required period and the period for which the prior pressure-equalization process is performed can be increased at the same time.

That is, according to the characteristic configuration of the pressure swing adsorption type hydrogen manufacturing apparatus of the present invention, the product recovery rate can be improved in a state where the purity of the product is kept from being reduced.

The pressure swing adsorption type hydrogen manufacturing apparatus of the present invention has a further characteristic configuration in which the process control unit is configured to control operation of the adsorption towers in such a manner that the pressure-restoration process including the prior pressure-equalization process and the pressurization process spans the entire unit processing period.

That is, the process control unit controls operation of the adsorption towers in such a manner that the pressure-restoration process including the prior pressure-equalization process and the pressurization process spans the entire unit processing period, and therefore the pressurization process and the prior pressure-equalization process can be performed using the entire unit processing period.

Accordingly, the product recovery rate can be further improved in a state where the purity of the product is kept from being reduced, by sufficiently increasing the length of the period of the prior pressure-equalization process while properly performing the pressurization process for a required period, using the entire unit processing period.

That is, according to the characteristic configuration of the pressure swing adsorption type hydrogen manufacturing apparatus of the present invention, the product recovery rate can be further improved in a state where the purity of the product is kept from being reduced.

BRIEF DESCRIPTION OF THE DRAWINGS

FIG. 5 is a diagram showing an operation manner in a unit processing period according to the other embodiment.

BEST MODE FOR CARRYING OUT THE INVENTION

Embodiment

Figure 1:
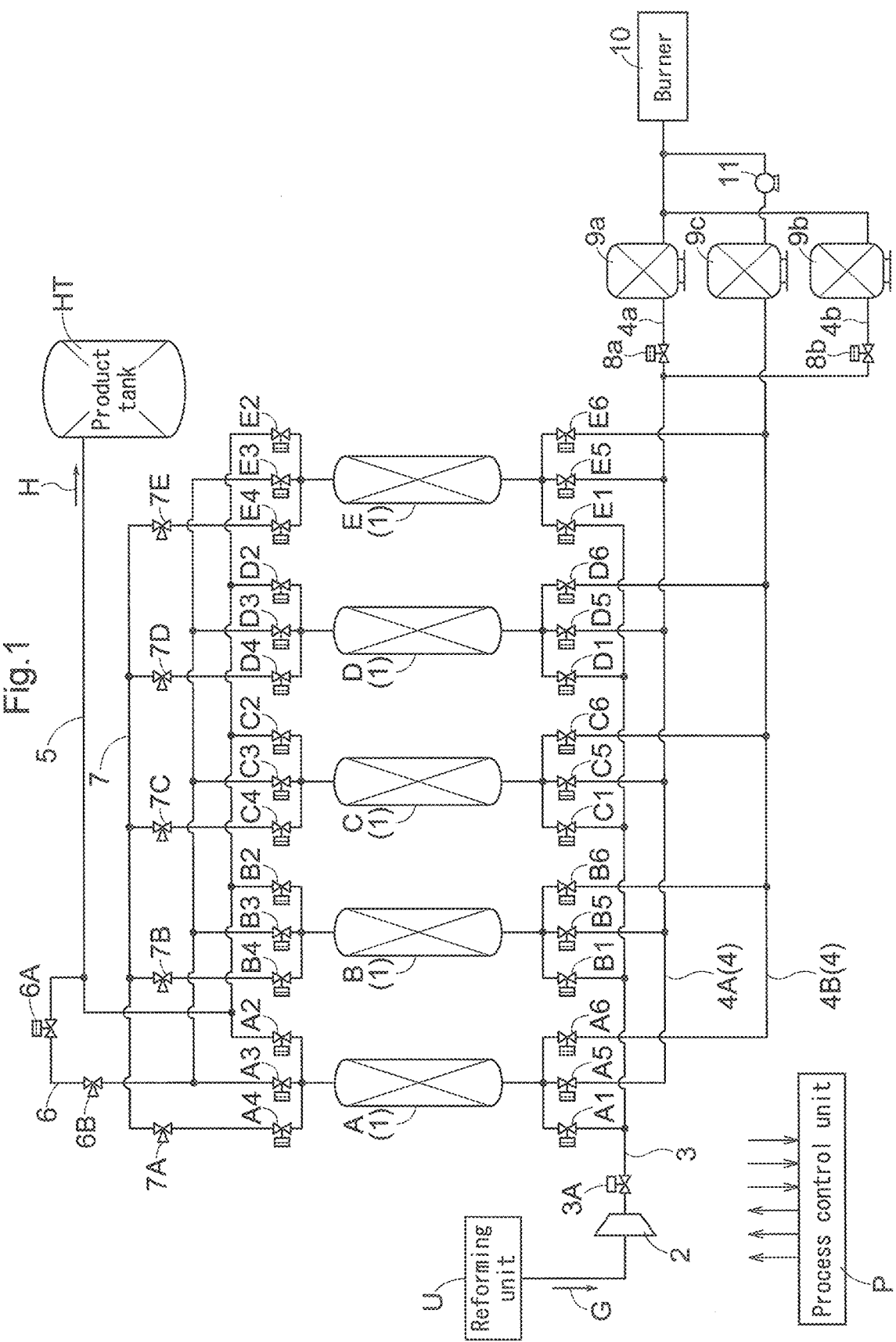
FIG. 1 is a schematic diagram showing a pressure swing adsorption type hydrogen manufacturing apparatus.

The following describes an embodiment of the present invention based on the accompanying drawings.
Overall Configuration As shown in FIG. 1, towers A, B, C, D, and E are provided in parallel to each other as five adsorption towers 1, and a source gas supply path 3 for supplying a source gas G that is compressed by a compressor 2 and off-gas discharge paths 4 for discharging off-gas are connected to lower portions of the five adsorption towers 1.

A tank-side off-gas discharge path 4A and a pump-side off-gas discharge path 4B are provided in parallel to each other as the off-gas discharge paths 4.

In this embodiment, a reformed gas that contains a large amount of hydrogen components is supplied as the source gas G from a reforming unit U that generates the reformed gas by reforming town gas that contains hydrocarbons.

The adsorption towers 1 are configured to generate a product gas by adsorbing, using adsorbents, adsorption target components other than the hydrogen components from the source gas G containing the hydrogen components.

That is, the source gas contains methane, carbon dioxide, carbon monoxide, moisture, and nitrogen as the adsorption target components other than hydrogen, and methane, carbon dioxide, carbon monoxide, moisture, and nitrogen are adsorbed by the adsorbents in the adsorption towers 1.

That is, the adsorbents include zeolite that adsorbs carbon monoxide and nitrogen, a carbon molecular sieve that adsorbs methane and carbon dioxide, and activated alumina that adsorbs moisture.

Source gas supply valves A1, B1, C1, D1, and E1 that open and close the source gas supply path 3, tank-side off-gas discharge valves A5, B5, C5, D5, and E5 that open and close the tank-side off-gas discharge path 4A, and pump-side off-gas discharge valves A6, B6, C6, D6, and E6 that open and close the pump-side off-gas discharge path 4B are provided respectively corresponding to the five adsorption towers 1.

It should be noted that a main gas valve 3A that is closed when the operation for producing hydrogen gas is stopped is provided at a location on the source gas supply path 3 that is downstream of the compressor 2.

A product gas feed path 5 for feeding a product gas H toward a product tank HT, a pressurization path 6 that diverges from the product gas feed path 5 and through which a portion of the product gas H flowing through the product gas feed path 5 is returned to the adsorption towers 1, and a pressure-equalization path 7 for connecting and bringing the five adsorption towers 1 into communication with each other are connected to upper portions of the five adsorption towers 1.

Further, product gas feed valves A2, B2, C2, D2, and E2 that allow and block communication with the product gas feed path 5, pressurization valves A3, B3, C3, D3, and E3 that allow and block communication with the pressurization path 6, and pressure-equalization adjustment valves A4, B4, C4, D4, and E4 that allow and block communication with the pressure-equalization path 7 are provided respectively corresponding to the five adsorption towers 1.

The pressurization path 6 is provided with a pressurization opening/closing valve 6A that opens and closes the pressurization path 6 and a pressurization adjustment valve 6B that adjusts the flow speed of the product gas H flowing through the pressurization path 6.

Further, pressure-equalization adjustment valves 7A, 7B, 7C, 7D, and 7E that adjust the speed of gas flowing through the pressure-equalization path 7 are provided on the pressure-equalization path 7, respectively corresponding to the five adsorption towers 1.

The tank-side off-gas discharge path 4A diverges into a first off-gas path 4a and a second off-gas path 4b, and the first off-gas path 4a and the second off-gas path 4b are configured to supply off-gas to a burner 10 for heating the reforming unit U.

The first off-gas path 4a is provided with a first off-gas tank 9a and a first off-gas valve 8a that opens and closes the first off-gas path 4a, and the second off-gas path 4b is provided with a second off-gas tank 9b and a second off-gas valve 8b that opens and closes the second off-gas path 4b.

Further, the pump-side off-gas discharge path 4B is provided with a third off-gas tank 9c and a vacuum pump 11, and off-gas flowing through the pump-side off-gas discharge path 4B is also supplied to the burner 10 for heating the reforming unit U, similarly to off-gas flowing through the first off-gas path 4a and off-gas flowing through the second off-gas path 4b.

Operation Control

A process control unit P that controls operation of the five adsorption towers 1 is provided, and the process control unit P is configured to control operation of the five adsorption towers 1 in a state where an adsorption process, a pressure-equalization discharge process, a desorption process, and a pressure-restoration process are successively repeated.

Figure 2:
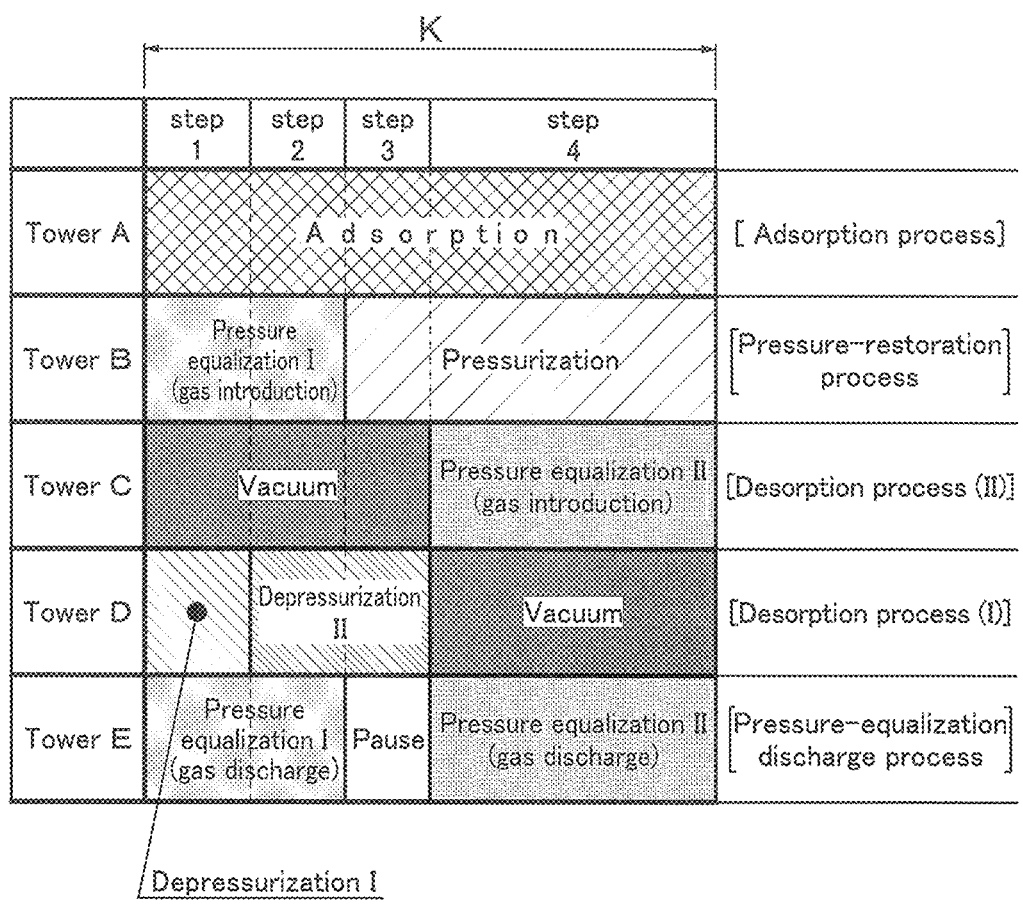
FIG. 2 is a diagram showing an operation manner in a unit processing period.
Figure 3:
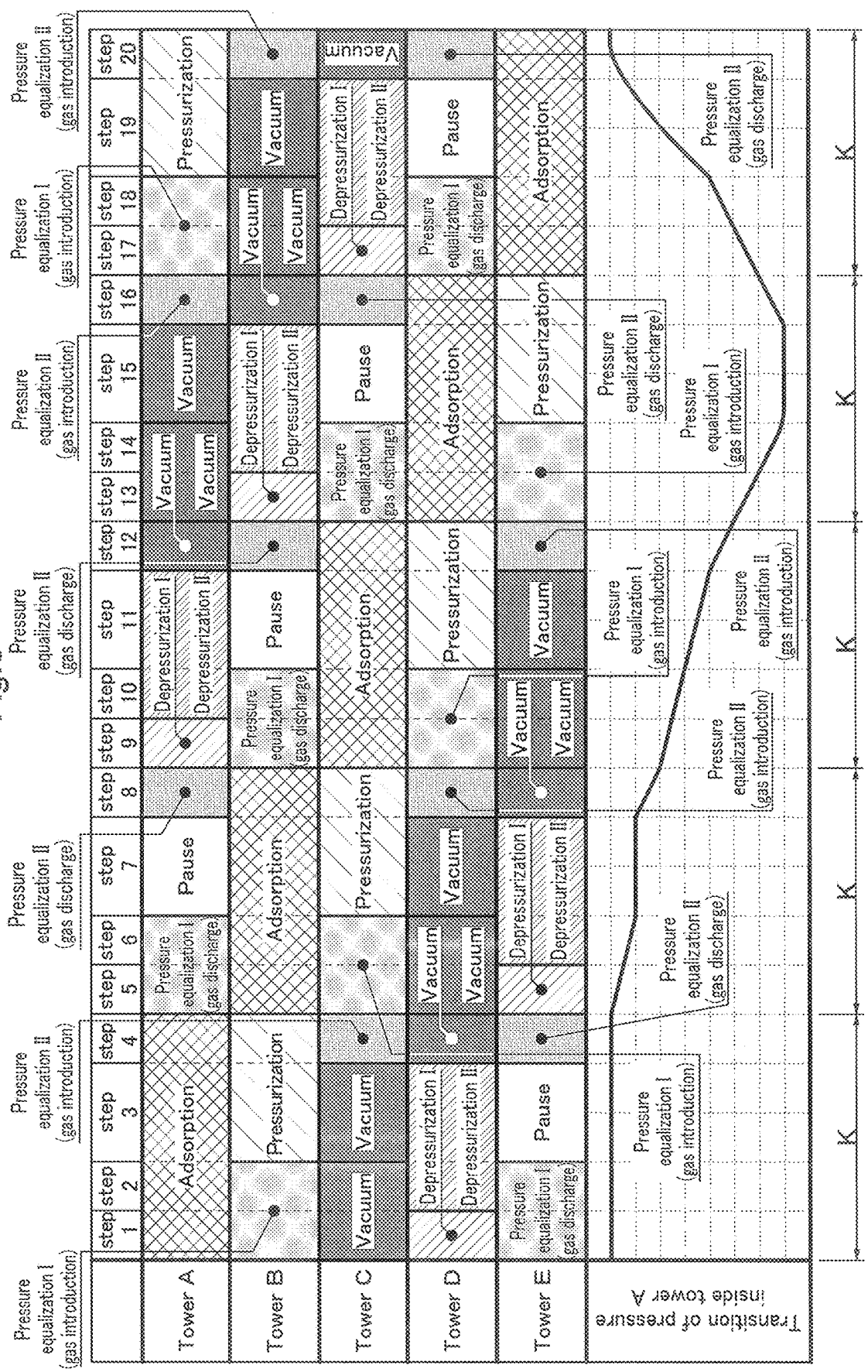
FIG. 3 is a diagram showing an operation cycle.

That is, as shown in FIGS. 2 and 3, the process control unit P is configured to control operation of the five adsorption towers 1 in such a manner that the adsorption process is performed for a unit processing period K in one of the adsorption towers 1, the pressure-equalization discharge process is performed for the unit processing period K in an adsorption tower 1 in which the process subsequent to the adsorption process is performed, the desorption process is performed for the unit processing period K in an adsorption tower 1 in which the process subsequent to the pressure-equalization discharge process is performed, and the pressure-restoration process that is the process preceding the adsorption process is performed for the unit processing period K in an adsorption tower 1 in which the process subsequent to the desorption process is performed.

Incidentally, five adsorption towers 1 are provided in this embodiment, and therefore the desorption process includes a desorption process I and a desorption process II that is performed after the desorption process I.

The five adsorption towers 1 are each configured to successively perform the adsorption process, the pressure-equalization discharge process, the desorption process I, the desorption process II, and the pressure-restoration process while switching to the next process every unit processing period K.

Incidentally, the unit processing period K is 70 seconds long and is constituted by four steps in this embodiment.

In this embodiment, the adsorption process, the pressure-equalization discharge process, the desorption process (the desorption process I and the desorption process II), and the pressure-restoration process are successively repeated with respect to the five adsorption towers 1, and accordingly, an operation cycle that includes 20 steps, i.e., steps 1 to 20, is executed in five unit processing periods K as shown in FIG. 3.

The process control unit P is configured such that pressure equalization I is performed in an initial stage of the unit processing period K as a prior pressure-equalization process of supplying gas inside an adsorption tower 1 undergoing the pressure-equalization discharge process to an adsorption tower 1 undergoing the pressure-restoration process, and pressure equalization II is performed in a final stage of the unit processing period K as a subsequent pressure-equalization process of supplying gas inside the adsorption tower 1 undergoing the pressure-equalization discharge process to an adsorption tower 1 undergoing the desorption process (desorption process II).

It should be noted that the "initial stage of the unit processing period K" means a period that starts at the beginning of the unit processing period K, and the "final stage of the unit processing period K" means a period that ends at the end of the unit processing period K.

The process control unit P is also configured such that a pressurization process of introducing the product gas H to perform pressurization is performed as the pressure-restoration process subsequently to the prior pressure-equalization process (pressure equalization I).

Additionally, the process control unit P is configured to control operation of the adsorption towers 1 in such a manner that the pressurization process is performed while overlapping with the subsequent pressure-equalization process (pressure equalization II).

In this embodiment, the process control unit P is configured to control operation of the adsorption towers 1 in such a manner that the pressure-restoration process including the prior pressure-equalization process (pressure equalization I) and the pressurization process spans the entire unit processing period K.

Details of Operation Manner in Unit Processing Period

Although the adsorption process, the pressure-equalization discharge process, the desorption process I, the desorption process II, and the pressure-restoration process are successively performed in each of the five adsorption towers 1 as described above, the following describes details of the operation manner in the unit processing period K based on FIG. 2, using a representative example in which the adsorption process is performed in the tower A, the pressure-restoration process is performed in the tower B, the desorption process II is performed in the tower C, the desorption process I is performed in the tower D, and the pressure-equalization discharge process is performed in the tower E.

That is, the source gas supply valve A1 and the product gas feed valve A2 corresponding to the tower A are opened for the unit processing period K to perform the adsorption process in the tower A.

In the initial stage of the unit processing period K, the pressure-equalization adjustment valve B4 corresponding to the tower B and the pressure-equalization adjustment valve E4 corresponding to the tower E are opened to perform pressure equalization I (prior discharge process) in which gas inside the tower E undergoing the pressure-equalization discharge process is supplied to the tower B undergoing the pressure-restoration process.

In the final stage of the unit processing period K, the pressure-equalization adjustment valve C4 corresponding to the tower C and the pressure-equalization adjustment valve E4 corresponding to the tower E are opened to perform pressure equalization II (subsequent discharge process) in which gas inside the tower E undergoing the pressure-equalization discharge process is supplied to the tower C undergoing the desorption process II.

That is, gas discharge for pressure equalization I (prior discharge process) and gas discharge for pressure equalization II (subsequent discharge process) are performed in the tower E in which the pressure-equalization discharge process is performed.

Gas discharge for pressure equalization I is performed in steps 1 and 2, gas discharge for pressure equalization II is performed in step 4, and there is a pause that corresponds to step 3 between gas discharge for pressure equalization I and gas discharge for pressure equalization II.

Subsequently to pressure equalization I (prior discharge process), the pressurization valve B3 corresponding to the tower B and the pressurization opening/closing valve 6A provided on the pressurization path 6 are opened to pressurize the tower B until the unit processing period K ends.

That is, gas introduction for pressure equalization I (prior discharge process) and pressurization are successively performed in the tower B in which the pressure-restoration process is performed.

Gas introduction for pressure equalization I (prior discharge process) is performed in steps 1 and 2, and pressurization is subsequently performed in steps 3 and 4, and accordingly, pressurization is performed while overlapping with pressure equalization II (subsequent discharge process) until the unit processing period K ends.

In the initial stage of the unit processing period K, the tank-side off-gas discharge valve D5 corresponding to the tower D and the first off-gas valve 8a are opened to perform depressurization I in which gas inside the tower D is discharged as off-gas through the first off-gas path 4a to the first off-gas tank 9a.

Subsequently to depressurization I, the second off-gas valve 8b is opened instead of the first off-gas valve 8a while keeping the tank-side off-gas discharge valve D5 open, to perform depressurization II in which gas inside the tower D is discharged as off-gas through the second off-gas path 4b to the second off-gas tank 9b.

Subsequently to depressurization II, the pump-side off-gas discharge valve D6 is opened instead of the tank-side off-gas discharge valve D5, to perform vacuum creation in which gas inside the tower D as off-gas is discharged through the pump-side off-gas discharge path 4B to the third off-gas tank 9c which has been sucked by the vacuum pump 11.

That is, depressurization I, depressurization II, and vacuum creation are successively performed in the tower D in which the desorption process I is performed.

Depressurization I is performed in step 1, depressurization II is performed in steps 2 and 3, and vacuum creation is performed in step 4.

In the initial stage of the unit processing period K, the pump-side off-gas discharge valve D6 corresponding to the tower C is opened, to perform vacuum creation in which gas inside the tower C as off-gas through the pump-side off-gas discharge path 4B to the third off-gas tank 9c which has been sucked by the vacuum pump 11.

That is, vacuum creation and gas introduction for pressure equalization II (subsequent discharge process) are successively performed in the tower C in which the desorption process II is performed.

Vacuum creation is performed in steps 1 to 3 and gas introduction for pressure equalization II (subsequent discharge process) is performed in step 3.

It should be noted that the internal pressure of the tower A is about 0.7 MPaG when the adsorption process is performed, and gradually decreases to a pressure equal to or lower than the atmospheric pressure as gas discharge for pressure equalization I, gas discharge for pressure equalization II, depressurization I, depressurization II, and vacuum creation are performed, as shown in FIG. 3.

The internal pressure of the tower A gradually increases and returns to about 0.7 MPaG as gas introduction for pressure equalization II, gas introduction for pressure equalization I, and pressurization are performed.

Another Embodiment

Next, another embodiment of a method for manufacturing hydrogen through pressure swing adsorption will be described. In this embodiment, four adsorption towers 1, i.e., towers A, B, C, and D are provided and washing is performed instead of vacuum creation performed in the above-described embodiment, but the basic configuration of this embodiment is similar to that of the above-described embodiment, and therefore the following describes differences from the above-described embodiment in detail.

Overall Configuration

Figure 4:
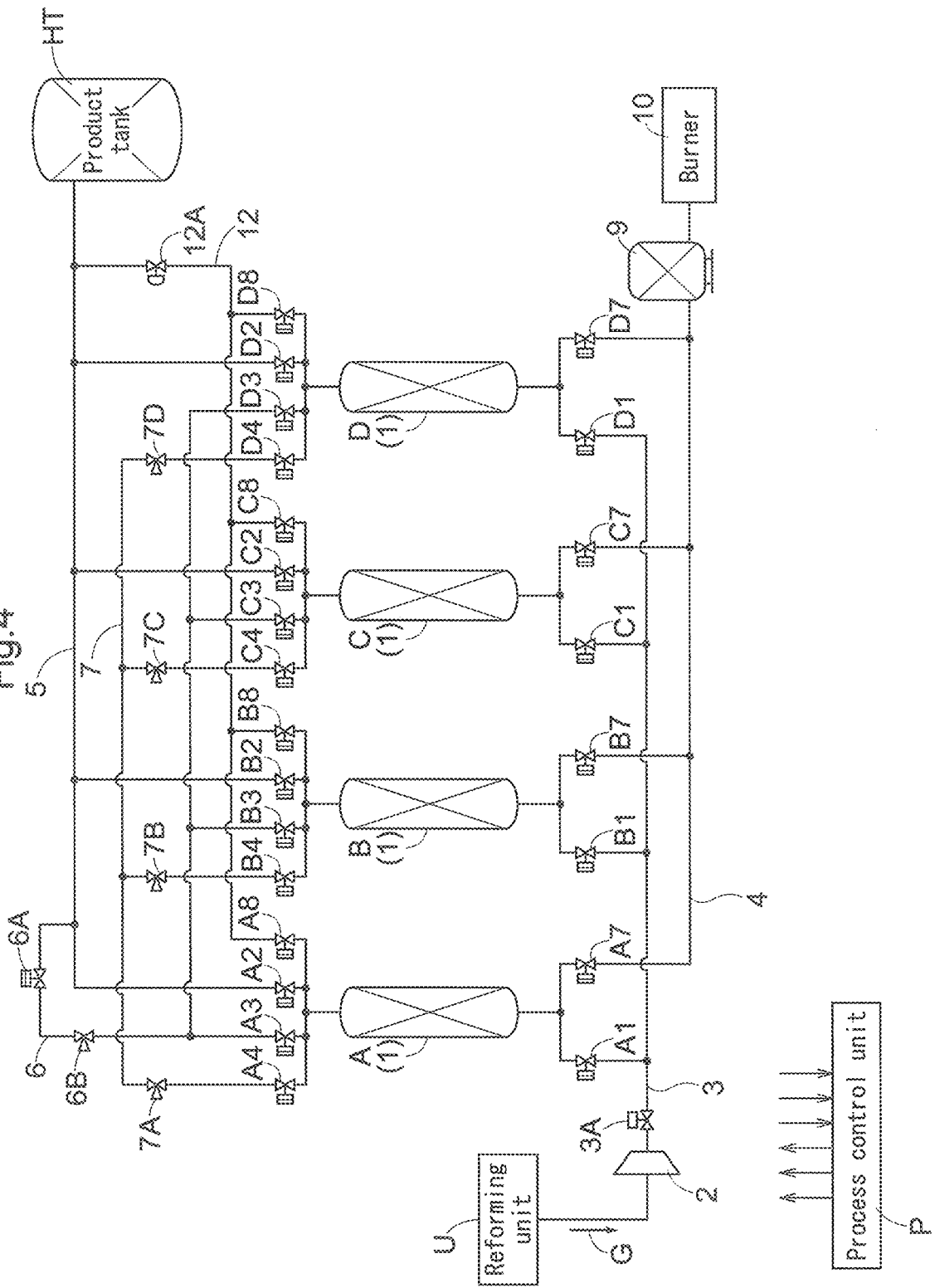
FIG. 4 is a schematic diagram showing a pressure swing adsorption type hydrogen manufacturing apparatus according to another embodiment.

As shown in FIG. 4, in a pressure swing adsorption type hydrogen manufacturing apparatus according to this embodiment, a single off-gas discharge path 4 is provided on the lower side of the adsorption towers 1, and a single off-gas tank 9 is provided on the off-gas discharge path 4.

Source gas supply valves A1, B1, C1, and D1 that open and close a source gas supply path 3 and off-gas discharge valves A7, B7, C7, and D7 that open and close the off-gas discharge path 4 are provided respectively corresponding to the four adsorption towers 1.

A product gas feed path 5 for feeding a product gas H toward a product tank HT, a pressurization path 6 that diverges from the product gas feed path 5 and through which a portion of the product gas H flowing through the product gas feed path 5 is returned to the adsorption towers 1, and a pressure-equalization path 7 for connecting and bringing the four adsorption towers 1 into communication with each other are connected to upper portions of the four adsorption towers 1.

Further, product gas feed valves A2, B2, C2, and D2 that allow and block communication with the product gas feed path 5, pressurization valves A3, B3, C3, and D3 that allow and block communication with the pressurization path 6, and pressure-equalization adjustment valves A4, B4, C4, and D4 that allow and block communication with the pressure-equalization path 7 are provided respectively corresponding to the four adsorption towers 1.

The pressurization path 6 is provided with a pressurization opening/closing valve 6A that opens and closes the pressurization path 6 and a pressurization adjustment valve 6B that adjusts the flow speed of the product gas H flowing through the pressurization path 6.

Pressure-equalization adjustment valves 7A, 7B, 7C, and 7D that adjust the speed of gas flowing through the pressure-equalization path 7 are provided on the pressure-equalization path 7, respectively corresponding to the four adsorption towers 1.

Additionally, a washing path 12 that diverges from the product gas feed path 5 and through which a portion of the product gas H flowing through the product gas feed path 5 is introduced into the adsorption towers 1 to perform washing is provided on the upper side of the four adsorption towers 1, washing valves A8, B8, C8, and D8 that allow and block communication with the washing path 12 are provided respectively corresponding to the four adsorption towers 1, and a washing adjustment valve 12A that adjusts the flow rate of the product gas H flowing through the washing path 12 is provided.

Operation Control

A process control unit P that controls operation of the four adsorption towers 1 is provided, and the process control unit P is configured to control operation of the four adsorption towers 1 in a state where an adsorption process, a pressure-equalization discharge process, a desorption process, and a pressure-restoration process are successively repeated.

That is, as shown in FIG. 5, the process control unit P is configured to control operation of the four adsorption towers 1 in such a manner that the adsorption process is performed for a unit processing period K in one of the adsorption towers 1, the pressure-equalization discharge process is performed for the unit processing period K in an adsorption tower 1 in which the process subsequent to the adsorption process is performed, the desorption process is performed for the unit processing period K in an adsorption tower 1 in which the process subsequent to the pressure-equalization discharge process is performed, and the pressure-restoration process that is the process preceding the adsorption process is performed for the unit processing period K in an adsorption tower 1 in which the process subsequent to the desorption process is performed.

Incidentally, the unit processing period K is 130 seconds long and is constituted by four steps in this embodiment.

In this embodiment, the adsorption process, the pressure-equalization discharge process, the desorption process, and the pressure-restoration process are successively repeated with respect to the four adsorption towers 1, and accordingly, an operation cycle that includes 16 steps, i.e., steps 1 to 16, is executed in four unit processing periods K, although this is not shown.

That is, although an example is shown in FIG. 3 in which the adsorption process is performed in the tower A, the pressure-equalization discharge process is performed in the tower D, the desorption process is performed in the tower C, and the pressure-restoration process is performed in the tower B for the unit processing period K, the adsorption process, the pressure-equalization discharge process, the desorption process, and the pressure-restoration process are successively repeated while switching adsorption towers 1 in which the respective processes are performed every unit processing period K.

It should be noted that the period of each step is set to be long compared to the steps in the above-described embodiment, because the adsorption towers 1 used in this embodiment are large towers having large capacities compared to the adsorption towers 1 used in the above-described embodiment.

The process control unit P is configured such that pressure equalization I is performed in an initial stage of the unit processing period K as a prior pressure-equalization process of supplying gas inside an adsorption tower 1 undergoing the pressure-equalization discharge process to an adsorption tower 1 undergoing the pressure-restoration process, and pressure equalization II is performed in a final stage of the unit processing period K as a subsequent pressure-equalization process of supplying gas inside the adsorption tower 1 undergoing the pressure-equalization discharge process to an adsorption tower 1 undergoing the desorption process.

It should be noted that the "initial stage of the unit processing period K" means a period that starts at the beginning of the unit processing period K, and the "final stage of the unit processing period K" means a period that ends at the end of the unit processing period K.

The process control unit P is also configured such that a pressurization process of introducing the product gas H to perform pressurization is performed as the pressure-restoration process subsequently to the prior pressure-equalization process (pressure equalization I).

Additionally, the process control unit P is configured to control operation of the adsorption towers 1 in such a manner that the pressurization process is performed while overlapping with the subsequent pressure-equalization process (pressure equalization II).

In this embodiment, the process control unit P is configured to control operation of the adsorption towers 1 in such a manner that the pressure-restoration process including the prior pressure-equalization process (pressure equalization I) and the pressurization process spans the entire unit processing period K.

Details of Operation Manner in Unit Processing Period

Although the adsorption process, the pressure-equalization discharge process, the desorption process, and the pressure-restoration process are successively performed in each of the four adsorption towers 1 as described above, the following describes details of the operation manner in the unit processing period K based on FIG. 5, using a representative example in which the adsorption process is performed in the tower A, the pressure-restoration process is performed in the tower B, the desorption process is performed in the tower C, and the pressure-equalization discharge process is performed in the tower D.

That is, the source gas supply valve A1 and the product gas feed valve A2 corresponding to the tower A are opened for the unit processing period K to perform the adsorption process in the tower A.

In the initial stage of the unit processing period K, the pressure-equalization adjustment valve B4 corresponding to the tower B and the pressure-equalization adjustment valve D4 corresponding to the tower D are opened to perform pressure equalization I (prior discharge process) in which gas inside the tower D undergoing the pressure-equalization discharge process is supplied to the tower B undergoing the pressure-restoration process.

In the final stage of the unit processing period K, the pressure-equalization adjustment valve C4 corresponding to the tower C and the pressure-equalization adjustment valve D4 corresponding to the tower D are opened to perform pressure equalization II (subsequent discharge process) in which gas inside the tower D undergoing the pressure-equalization discharge process is supplied to the tower C undergoing the desorption process.

That is, gas discharge for pressure equalization I (prior discharge process) and gas discharge for pressure equalization II (subsequent discharge process) are performed in the tower D in which the pressure-equalization discharge process is performed.

Gas discharge for pressure equalization I is performed in steps 1 and 2, gas discharge for pressure equalization II is performed in step 4, and there is a pause that corresponds to step 3 between gas discharge for pressure equalization I and gas discharge for pressure equalization II.

Subsequently to pressure equalization I (prior discharge process), the pressurization valve B3 corresponding to the tower B and the pressurization opening/closing valve 6A provided on the pressurization path 6 are opened to pressurize the tower B until the unit processing period K ends.

That is, gas introduction for pressure equalization I (prior discharge process) and pressurization are successively performed in the tower B in which the pressure-restoration process is performed.

Gas introduction for pressure equalization I (prior discharge process) is performed in steps 1 and 2, and pressurization is subsequently performed in steps 3 and 4, and accordingly, pressurization is performed while overlapping with pressure equalization II (subsequent discharge process) until the unit processing period K ends.

In the initial stage of the unit processing period K, the off-gas discharge valve C7 corresponding to the tower C is opened to perform depressurization in which gas inside the tower C is discharged as off-gas through the off-gas discharge path 4 to the off-gas tank 9.

Subsequently to depressurization, the washing valve C8 corresponding to the tower C is opened while keeping the off-gas discharge valve C7 open, to perform washing by introducing the product gas H, which serves as a washing gas, from the washing path 12 to flow inside the tower C. It should be noted that the washing gas used for the washing is discharged through the off-gas discharge path 4 to the off-gas tank 9.

That is, depressurization, washing, and gas introduction for pressure equalization II (subsequent discharge process) are successively performed in the tower C in which the desorption process is performed.

Depressurization is performed in step 1, washing is performed in steps 2 and 3, and gas introduction for pressure equalization II (subsequent discharge process) is performed in step 4.

Other Embodiments

Other embodiments are listed below.

(1) Although an example is described in the above-described embodiment and other embodiment in which the process control unit P controls operation of the adsorption towers 1 in such a manner that the pressure-restoration process including the prior pressure-equalization process (pressure equalization I) and the pressurization process spans the entire unit processing period K, the present invention may also be carried out in a state where the pressurization process is performed while overlapping with the subsequent pressure-equalization process (pressure equalization II) and is ended before the unit processing period K ends.

(2) Although an example is described in the above-described embodiment and other embodiment in which the source gas contains methane, carbon dioxide, carbon monoxide, and nitrogen as the adsorption target components other than hydrogen and hydrogen gas, various gases that contain hydrogen and adsorption target components other than hydrogen components can be used as the source gas in the pressure swing adsorption type hydrogen manufacturing apparatus of the present invention.

(3) Although an example is described in the above-described embodiment in which vacuum creation is performed in the desorption process in a case where five adsorption towers 1 are provided and an example is described in the above-described other embodiment in which washing is performed in the desorption process in a case where four adsorption towers 1 are provided, washing may be performed in the desorption process in a case where five adsorption towers 1 are provided, and vacuum creation may be performed in the desorption process in a case where four adsorption towers 1 are provided.

It should be noted that the configurations disclosed in the above-described embodiments (including the other embodiments, the same applies below) can be applied in combination with configurations disclosed in other embodiments so long as no contradiction is incurred, the embodiments disclosed in the present specification are mere examples, and embodiments of the present invention are not limited to those disclosed in the present specification and can be modified as appropriate without departing from the object of the present invention.

DESCRIPTION OF REFERENCE SIGNS

1: Adsorption tower
K: Unit processing period
P: Process control unit

The invention claimed is:

1. A pressure swing adsorption type hydrogen manufacturing apparatus comprising:
   four or five adsorption towers configured to generate a product gas by adsorbing, using adsorbents, adsorption target components other than hydrogen components from a source gas that contains the hydrogen components; and
   a process control unit configured to control operation of the adsorption towers in such a manner that an adsorption process is performed for a unit processing period in one of the adsorption towers, a pressure-equalization discharge process is performed for the unit processing period in another of the adsorption towers in which a process subsequent to the adsorption process is performed, a desorption process is performed for the unit processing period in another of the adsorption towers in which a process subsequent to the pressure-equalization discharge process is performed, and a pressure-restoration process that is a process preceding the adsorption process is performed for the unit processing period in another of the adsorption towers in which a process subsequent to the desorption process is performed,
   wherein the process control unit is configured such that a prior pressure-equalization process of supplying gas inside the adsorption tower undergoing the pressure-equalization discharge process to the adsorption tower undergoing the pressure-restoration process is performed in an initial stage of the unit processing period, a subsequent pressure-equalization process of supplying gas inside the adsorption tower undergoing the pressure-equalization discharge process to the adsorption tower undergoing the desorption process is performed in a final stage of the unit processing period, and a pressurization process of introducing the product gas to perform pressurization is performed, as the pressure-restoration process, subsequently to the prior pressure-equalization process, and
   the process control unit is configured to control operation of the adsorption towers in such a manner that the pressurization process is performed while overlapping with the subsequent pressure-equalization process, the pressure swing adsorption type hydrogen manufacturing apparatus further comprising:
   a pressure-equalization path for connecting and bringing the four or five adsorption towers into communication with each other and which is connected to the four or five adsorption towers,
   pressure-equalization adjustment valves that adjust speed of gas flowing through the pressure-equalization path and which are provided on the pressure-equalization path, so as to correspond to the four or five adsorption towers, and wherein
   in the adsorption tower for the pressure-equalization discharge process, there is a pause between the prior pressure-equalization process and the subsequent pressure-equalization process.

2. The pressure swing adsorption type hydrogen manufacturing apparatus according to claim 1,
   wherein the process control unit is configured to control operation of the adsorption towers in such a manner that the pressure-restoration process including the prior pressure-equalization process and the pressurization process spans the entire unit processing period.

* * * * *